United States Patent
Suzuki

(10) Patent No.: US 8,154,597 B2
(45) Date of Patent: Apr. 10, 2012

(54) ON-VEHICLE EMERGENCY CALL APPARATUS

(75) Inventor: Takeyuki Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1038 days.

(21) Appl. No.: 12/047,899

(22) Filed: Mar. 13, 2008

(65) Prior Publication Data

US 2008/0225118 A1    Sep. 18, 2008

(30) Foreign Application Priority Data

Mar. 16, 2007    (JP) .................................. 2007-068766

(51) Int. Cl.
H04N 7/18    (2006.01)
(52) U.S. Cl. .................................. 348/148; 348/207.99
(58) Field of Classification Search .................. None
See application file for complete search history.

(56) References Cited

U.S. PATENT DOCUMENTS

2004/0201697 A1 * 10/2004 Klein ........................ 348/207.99
2010/0100276 A1 * 4/2010 Fujinawa et al. ............. 348/148

FOREIGN PATENT DOCUMENTS

JP    2005-265572 A    9/2005

* cited by examiner

Primary Examiner — Thu Nguyen
Assistant Examiner — Nam Tran
(74) Attorney, Agent, or Firm — Arent Fox LLP

(57) ABSTRACT

An on-vehicle emergency call apparatus includes: a camera capturing an image of an interior of a vehicle; a capturing controller controlling the camera; and a transmitter transmitting an image capturing result obtained by the capturing camera to an emergency information center. The capturing controller controls the camera so as to capture images while switching alternately between an instant capturing shutter speed for capturing an instant image of a subject and a translocation capturing shutter speed for capturing a translocation image of the subject, in which instant capturing shutter speed and the translocation capturing shutter speed are different from each other. An image superimposer can superimpose the instant image and the translocation image to produce the image capturing result. An incident detector can detect an incident involving the vehicle whereupon the image superimposer superimposes the instant image and the translocation image to produce the image capturing result when the incident detector detects an incident involving the vehicle.

6 Claims, 3 Drawing Sheets

ON-VEHICLE EMERGENCY CALL APPARATUS

BACKGROUND OF THE INVENTION

1. Field of the Invention

The present invention relates to an on-vehicle emergency call apparatus.

This application claims the priority of Japanese Application No. 2007-068766, filed Mar. 16, 2007, the entire specification, claims and drawings of which are incorporated herewith by reference.

2. Description of Related Art

Conventionally, an on-vehicle emergency call apparatus is known, which detects an accident and automatically notifies an emergency contact address when a vehicle or the like has the accident. An on-vehicle emergency call apparatus has been proposed which transmits images from an in-vehicle camera and an external camera of the vehicle to the emergency contact address with notification of the occurrence of the accident when the vehicle is impacted so that conditions of the interior and exterior of the vehicle can be known at the emergency contact address (e.g., see Japanese Unexamined Patent Application, First Publication No. 2005-265572).

In the above-mentioned on-vehicle emergency call apparatus, a mobile communication terminal such as a mobile phone or the like is used means to communicate with the emergency contact address. However, a channel of the above-mentioned mobile communication terminal does not have high enough transmission speed and is not suitable since it takes too long to transmit a video having a large file-size.

SUMMARY OF THE INVENTION

The present invention provides an on-vehicle emergency call apparatus which can obtain enough information to know a movement of a subject using a still picture.

In order to solve the above problem, the present invention is an on-vehicle emergency call apparatus including: a camera capturing an image of an interior of a vehicle; a capturing controller controlling the camera; and a transmitter transmitting an image capturing result obtained by the capturing camera to an emergency information center, wherein the capturing controller controls the camera so as to capture images while switching alternately between an instant capturing shutter speed for capturing an instant image of a subject and a translocation capturing shutter speed for capturing a translocation image of the subject, in which instant capturing shutter speed and the translocation capturing shutter speed are different from each other.

In this application, "translocation" means the movement of an object from one location or position to another location or position. Thus, a translocation image is an image showing such movement (FIG. 2).

According to the above invention, since the camera or capturing device captures the image by alternating between the instant capturing shutter speed and the translocation capturing shutter speed, a location of the subject while moving when the image is obtained can be known by the instant image image-captured at the instant capturing shutter speed; and further, a movement translocation of the subject between the instant images can be known by the translocation image obtained at the translocation capturing shutter speed. Therefore, it is effective to obtain enough information to know a movement condition of the subject based on a still picture having a smaller file-size than that of a video.

In addition, since the file-size can be reduced in comparison with transmitting a video, for example, it is effective to shorten the information transmission time when an image file is transmitted outside.

The above on-vehicle emergency call apparatus may further have an image superimposer or image superimposing device superimposing the instant image and the translocation image to produce the image capturing result.

In this case, since one image can be transmitted by superimposing the instant image and the translocation image, it is effective for prompt notification in comparison with a case in which images are transmitted successively by reducing the total amount of image data for transmission, even though channel capacity is deteriorated owing to the communication channel being jammed.

In another aspect of the invention, the invention includes an incident detector detecting an incident involving the vehicle; and wherein the image superimposer superimposes the instant image and the translocation image to produce the image capturing result when the incident detector detects an incident involving the vehicle.

In yet another aspect of the invention, the invention can include an on-vehicle emergency call method including: capturing an image of the interior of a vehicle; controlling a camera; and transmitting an image capturing result obtained by the camera to an emergency information center, wherein the controlling of the camera is by switching alternately between an instant capturing shutter speed for capturing an instant image of a subject and a translocation capturing shutter speed for capturing a translocation image of the subject, in which the instant capturing shutter speed and the translocation capturing shutter speed are different from each other. The method can further include superimposing the instant image and the translocation image to produce the image capturing result. The method can still further include detecting an incident involving the vehicle; and wherein the superimposing of the instant image and the translocation image to produce the image capturing result occurs when an incident involving the vehicle is detected.

DETAILED DESCRIPTION OF THE INVENTION

A first embodiment of the present invention will be explained referring to drawings.

Figure 1:
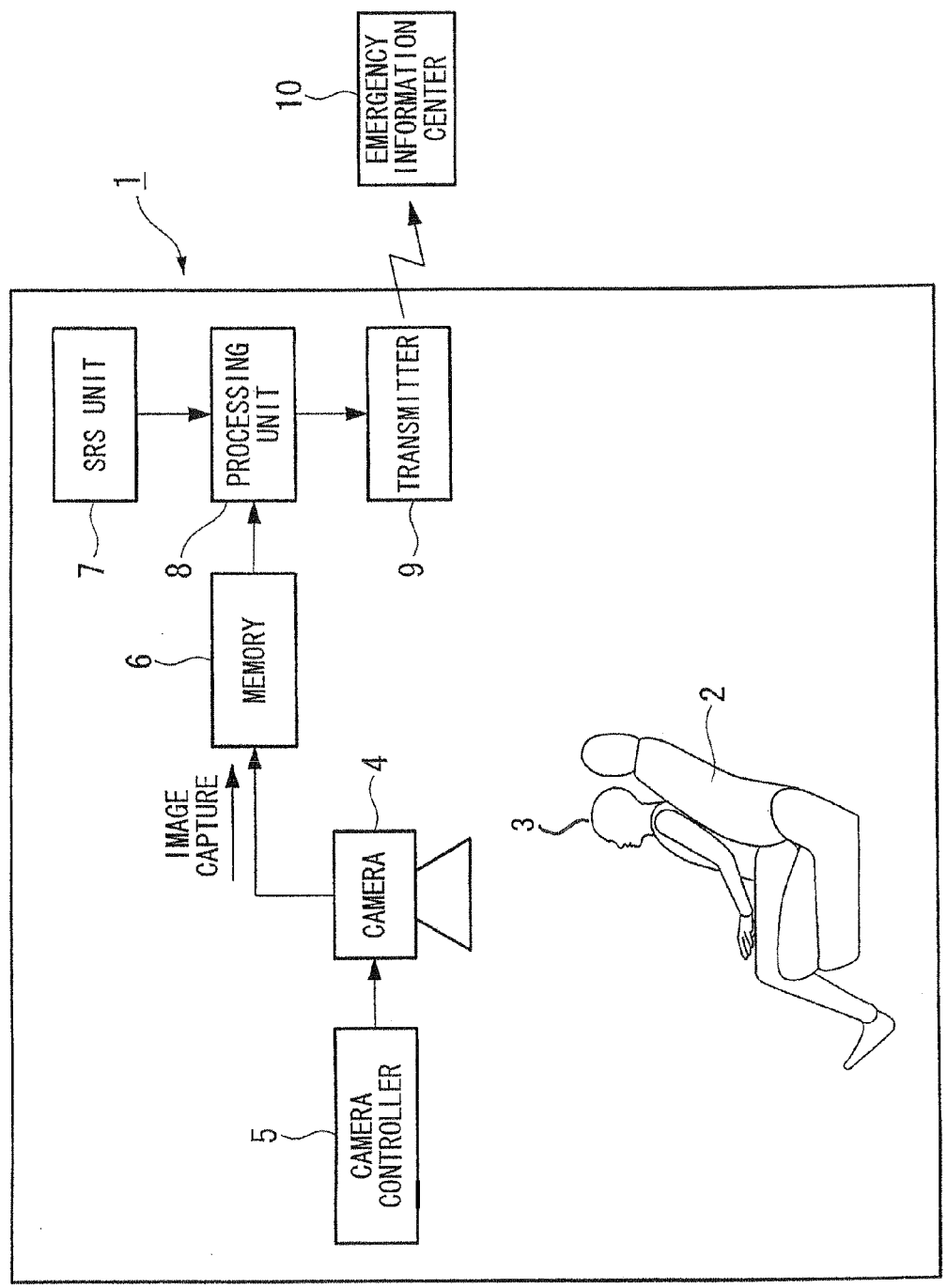
FIG. 1 is a block diagram showing an emergency call apparatus according to an embodiment of the present invention.

Reference symbol 1 in FIG. 1 denotes an emergency call apparatus 1 of the present embodiment. The emergency call apparatus 1 is mounted on a vehicle such as a motorcar or the like, and is structured so as to send the location information of the vehicle detected by a GPS apparatus (not shown) and the like to an external emergency information center 10 when an incident involving the vehicle, such as an accident or the like occurs.

The emergency call apparatus 1 is provided with a camera (i.e., a capturing device or means for capturing an image) 4 which captures an image of a seated passenger 3 at a roof portion above a seat 2 in order to know the interior condition of the vehicle when an incident occurs. An image captured by the camera 4 is transmitted to the emergency information center 10 with the location information of the vehicle. The camera 4 is, for example, a CCD camera, a CMOS camera, or the like, and captures images in accordance with control signals of a camera controller (i.e., a capturing control device or means for controlling the capturing means) 5. In addition, the position of the camera 4 is not limited to a location above the passenger; the camera 4 is arranged where a movement of the passenger can be known. Further, a wide-angle lens is used in order to cover the amount of movement the passenger.

The camera controller 5 is set so as to control the camera 4 to image capture the passenger at every prescribed time when the passenger is seated on the seat 2 and an ignition is detected to be ON. The images captured by the camera 4 are stored in a memory 6 as data. More specifically, the camera controller 5 is set so as to control image capturing of the camera 4 to alternate between a fast shutter speed (i.e., an instant capturing shutter speed) and a slow shutter speed (i.e., a translocation capturing shutter speed). Instant images captured at the fast shutter speed and translocation images captured at the slow shutter speed, in which the speeds are different, are alternately stored in the memory 6.

Figure 2:
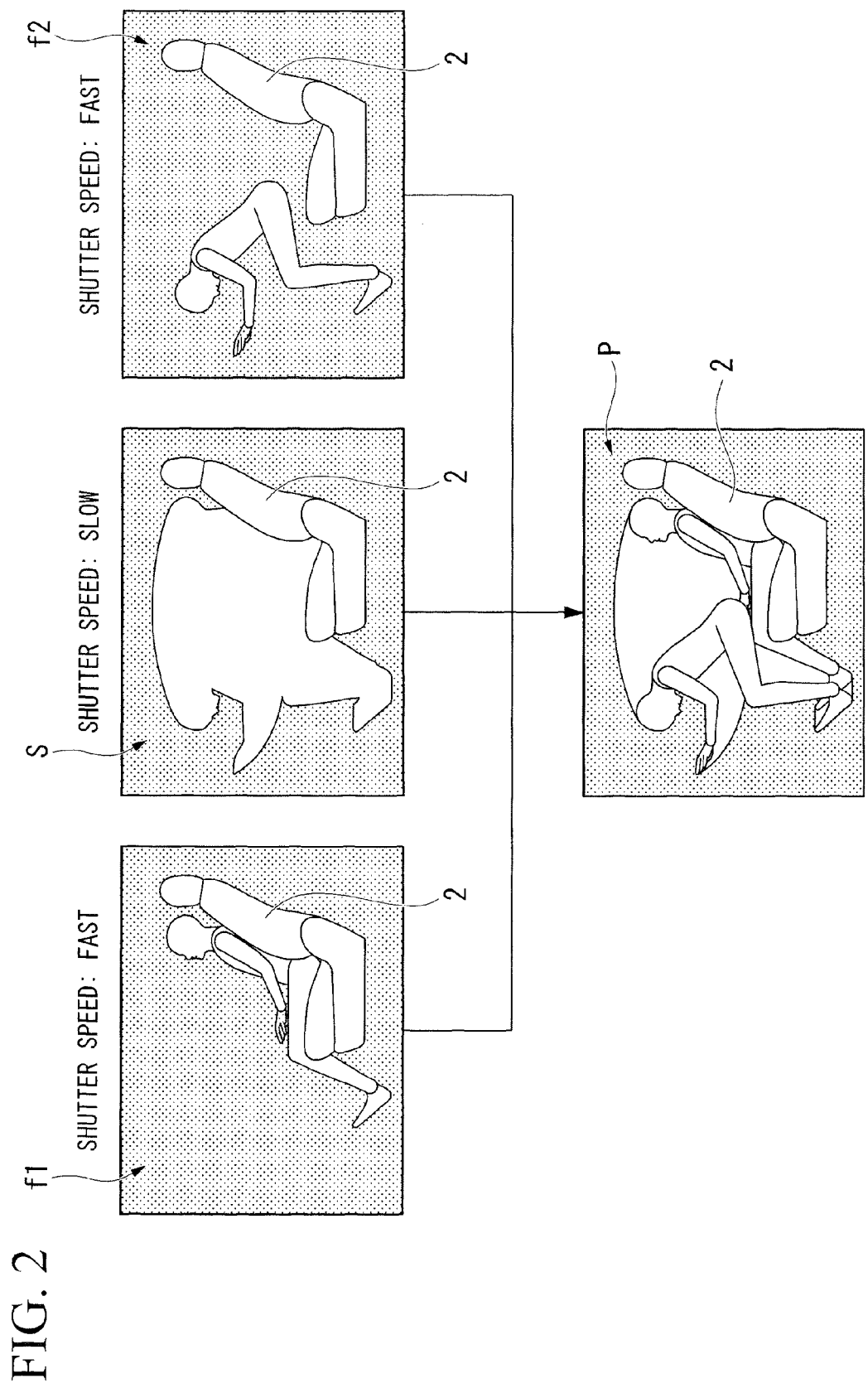
FIG. 2 is an explanatory view showing a superimposition of an instant image and a translocation image according to an embodiment of the present invention.

The instant images image captured at the fast shutter speed are still pictures captured at a shutter speed (e.g., about 1/100 second to 1/300 second) in which blurs of the passenger on the images cannot be recognized even if the passenger is moving (see, the images f1, f2 in FIG. 2). The translocation image captured at the slow shutter speed is a still picture captured at a shutter speed of, for example, about 1/30 second to 1/60 second in which movement owing to blurs of the passenger can appear on the images when the passenger moves (see, the image "S" in FIG. 2). In a case in which the shutter speed is slow, the movement of the passenger while the shutter of the camera 4 opens appears on the image; therefore, the time of the movement (translocation) can be regulated by regulating the open time of the shutter. The memory 6 functions as a ring buffer, and overwrites on and deletes old data sequently when memory capacity decreases owing to storage of the image data.

The emergency call apparatus 1 has an SRS unit (i.e., an incident detector, or an accident detection device or means for detecting an incident involving the vehicle) 7 which functions when an accident occurs in the vehicle. The SRS unit 7 has a sensor (not shown) which detects the impact of a collision, and outputs a signal showing the occurrence of an incident such as an accident to a processing unit 8 by deciding that an accident occurs when the sensor detect an impact.

The processing unit 8 selects images captured immediately before and after the occurrence of the accident from the images stored in the memory 6, and transmits them to a transmitter (i.e., transmission device or means for transmitting) 9 with information of the occurrence of the accident when it is detected that an accident occurs in accordance with the output signal of the SRS unit 7.

More specifically, the processing unit 8 selects at least, as shown in FIG. 2, an image f1 (hereinafter, "an instant image f1") in which the passenger who is seated in the seat 2 is image captured at the fast shutter speed immediately before the incident, an image f2 (hereinafter, "an instant image f2") in which the passenger moves forward is image captured at the fast shutter speed immediately after the accident, and an image "s" (hereinafter, "a translocation image "s") is image captured at the slow shutter speed between the instant images f1 and f2 from a plurality of images stored in the memory 6. Then, the processing unit 8 superimposes the instant images f1, f2 and the translocation image "s" as one image and transmits it to the transmitter 9. Note, the images shown in FIG. 2 are examples in a case in which the images of the passenger are captured from the side thereof. In addition, it is explained that three images are superimposed for convenience of the drawings; however, the number of images which are superimposed is not limited to three. All images which are captured in a prescribed time frame can be superimposed.

There are various methods of superimposing the instant images f1, f2, and the translocation image "s". For example, it is possible to raise the transmissivity of the instant images f1, f2, and the translocation image "s" and superimpose them; alternately, it is possible to calculate the differences between the instant image f1 and the instant image f2 and superimpose them on the translocation image "s".

The transmitter 9 transmits an image in which the instant images f1, f2, and the translocation image "s" are superimposed from the processing unit 8 to the emergency information center 10. A mobile communication terminal such as a mobile phone can be used as the transmitter 9. The image date is transmitted by packet communication by the mobile communication terminal.

Figure 3:
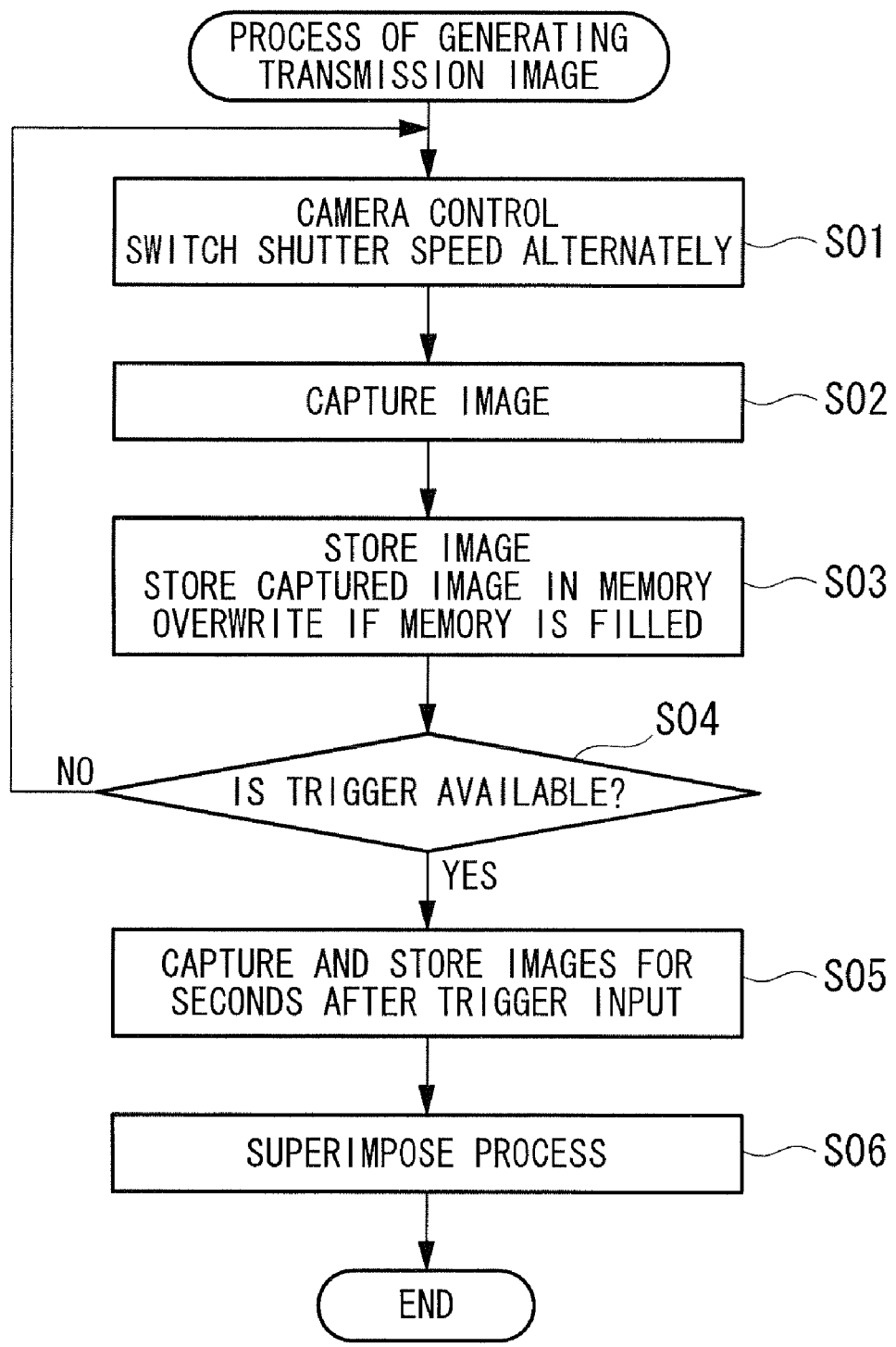
FIG. 3 is a flowchart showing a process of generating a transmission image according to an embodiment of the present invention.

Next, the generation process of a transmitted image in the on-vehicle emergency call apparatus 1 of the above-mentioned embodiment will be explained referring to FIG. 3.

First, in Step S01, the camera controller 5 switches alternately between the fast shutter speed and the slow shutter speed. Switching alternately between the shutter speeds means changing the shutter speed every time the process in Step S01 is conducted. For example, when the fast shutter speed is set in the fast Step S01, the slow shutter speed is set in the next Step S01.

Next, in Step S02, the camera 4 captures an image at the shutter speed set in Step S01.

In Step S03, the memory 6 stores the image image-captured by the camera 4. As described above, the image data is overwritten sequently on older image data and stored in the memory 6 if the memory 6 is filled with data.

In Step S04, it is decided whether or not a trigger is available. Here, the process in Step S04, it is set as the trigger that the processing unit 8 receives a signal input from the SRS unit 7 that indicates an occurrence of an incident. If the decision result is "YES" (i.e., if the trigger is available), the process is advanced to Step S05. Otherwise, the decision result is "NO" (i.e., if the trigger is not available), and the process is returned to Step S01 and the above-mentioned process is repeated with a changing shutter speed.

In Step S05, images are image captured for seconds after the trigger is inputted; then the process is advanced to Step S06 (an image superimposing device or superimposer or means for superimposing). In the process of Step S05, also after the input of the trigger, i.e., after the accident occurs, images captured while switching alternately between the fast shutter speed and the slow shutter speed similarly to the above-mentioned process in Step S01 to Step S03 are stored in the memory 6 for a subscribed time (e.g., for a few seconds).

In Step S06, a subscribed number of images immediately before and after the trigger input are selected from the images which are stored in the memory 6 by the processing unit 8, and are superimposed each other as one image P by the above-mentioned method. The image P is transmitted to the emergency information center 10 via the transmitter 9.

That is, the camera controller 5 controls the camera 4 so as to capture images at the fast shutter speed and the slow shutter speed alternately. If the processing unit 8 is inputted the trigger from the SRS unit 7, the images which are stored in the memory 6 from immediately before the trigger input to immediately after the trigger input are selected and superimposed on each other. The superimposed image is transmitted to the emergency information center 10.

Therefore, according to the above-mentioned embodiment, the positions of the subject when the images thereof are captured can be known from the instant images captured at the fast shutter speed by the camera 4 taking images alternating between the fast shutter speed and the slow shutter speed. Further, the movement translocation of the subject between the instant images can be known from the translocation image captured at the slow shutter speed. Therefore, enough information for knowing the movement state of the subject can be obtained from a still picture having a smaller file-size than that of a video.

The file-size of the image can be reduced when a still picture is transmitted compared with transmitting a movie. Therefore, transmitting time of the information can be shortened when the image is transmitted to the emergency information center 10.

In addition, a plurality of instant images and a translocation image captured by the camera 4 are superimposed into one still picture; thus, the total amount of transmitted images can be reduced compared with transmitting images successively. Therefore, a prompt call can be performed even though the communication channel is jammed and channel capacity is deteriorated.

The present invention is not limited to the above-mentioned embodiments. Other wireless communication channels as well as mobile phones can be utilized.

It is explained that the camera 4 begins to capture images with the ignition "ON" in the above-mentioned embodiment. However, the camera 4 can begin to capture images when it is detected that a door of the vehicle is opened or closed, or when a tongue of a seat belt is inserted into a buckle.

Furthermore, in the above-mentioned embodiment, it is explained that the processing unit 8 superimposes the instant images and the translocation image. However, the instant images and the translocation image can be separately transmitted to the emergency information center 10 and superimposed there.

What is claimed is:

1. An on-vehicle emergency call apparatus comprising:
a camera capturing an image of a subject within an interior of a vehicle;
a capturing controller controlling the camera;
a transmitter transmitting an image capturing result to an emergency information center,
wherein the capturing controller controls the camera to capture images while switching alternately between an instant capturing shutter speed for capturing a plurality of instant images of the subject and a translocation capturing shutter speed for capturing a plurality of translocation images of the subject, in which instant capturing shutter speed and the translocation capturing shutter speed are different from each other; and
a processing unit configured to select at least one instant image captured by the camera and at least one translocation image captured by the camera, the processing unit also being configured to superimpose the at least one instant image and the at least one translocation image to produce the image capturing result, wherein the processing unit transmits the image capturing result to the transmitter.

2. The on-vehicle emergency call apparatus according to claim 1, further comprising an incident detector detecting an incident involving the vehicle, wherein the incident detector outputs a signal indicating the occurrence of the incident to the processing unit, and wherein the at least one instant image selected by the processing unit is captured before the incident and the at least one translocation image is captured after the incident.

3. An on-vehicle emergency call apparatus comprising:
image capturing means for capturing an image of a subject within an interior of a vehicle;
image capturing controller means for controlling the image capturing means;
transmitting means for transmitting an image capturing result to an emergency information center,
wherein the image capturing controlling means controls the image capturing means to capture images while switching alternately between an instant capturing shutter speed for capturing a plurality of instant images of the subject and a translocation capturing shutter speed for capturing a plurality of translocation images of the subject, in which the instant capturing shutter speed and the translocation capturing shutter speed are different from each other; and
processing means configured to select at least one instant image captured by the image capturing means and at least one translocation image captured by the image capturing means, the processing means also being configured to superimpose the at least one instant image and the at least one translocation image to produce the image capturing result, wherein the processing means transmits the image capturing result to transmitting means.

4. The on-vehicle emergency call apparatus according to claim 3, further comprising an incident detecting means for detecting an incident involving the vehicle, and wherein the incident detecting means outputs a signal indicating the occurrence of the incident to the processing means, and wherein the at least one instant image selected by the processing means is captured before the incident and the at least one translocation image is captured after the incident.

5. An on-vehicle emergency call method comprising:
capturing an image of a subject within an interior of a vehicle;
controlling a camera;
transmitting an image capturing result to an emergency information center,
wherein the camera is controlled to switch alternately between an instant capturing shutter speed for capturing a plurality of instant images of the subject and a translocation capturing shutter speed for capturing a plurality of translocation images of the subject, in which the instant capturing shutter speed and the translocation capturing shutter speed are different from each other;
a processing unit selecting at least one instant image captured by the camera and at least one translocation image captured by the camera;
the processing unit superimposing the at least one instant image and the at least one translocation image to produce the image capturing result; and
the processing unit transmitting the image capturing result to a transmitter to be transmitted to the emergency information center.

6. The on-vehicle emergency call method according to claim 5, further comprising an incident detector detecting an incident involving the vehicle and outputting a signal to the processing unit indicating the occurrence of the incident, wherein the selected at least one instant image is captured before the incident and the selected at least one translocation image is captured after the incident.

* * * * *

UNITED STATES PATENT AND TRADEMARK OFFICE
CERTIFICATE OF CORRECTION

PATENT NO. : 8,154,597 B2
APPLICATION NO. : 12/047899
DATED : April 10, 2012
INVENTOR(S) : Takeyuki Suzuki Page 1 of 1

It is certified that error appears in the above-identified patent and that said Letters Patent is hereby corrected as shown below:

Title page, Item (75)

(75) Inventor: Takeyuki Suzuki, Saitama (JP) should read
Inventor: Takeyuki Suzuki, Utsunomiya-shi (JP)

Signed and Sealed this
Second Day of April, 2013

Teresa Stanek Rea
*Acting Director of the United States Patent and Trademark Office*